United States Patent

Wong

[11] 4,287,926
[45] Sep. 8, 1981

[54] TIRE TRACTION DEVICE

[76] Inventor: James K. C. Wong, 5100 Marine Dr., Chicago, Ill. 60640

[21] Appl. No.: 52,249

[22] Filed: Jun. 26, 1979

[51] Int. Cl.³ .................. B60C 27/04; B60C 27/20
[52] U.S. Cl. .................. 152/225 C; 152/228
[58] Field of Search .............. 156/225 C, 225 R, 228, 156/227, 226, 229, 230; 152/213 R, 216, 218, 220

[56] References Cited

U.S. PATENT DOCUMENTS

| 1,882,376 | 10/1932 | Weber | 192/225 |
| 2,597,458 | 5/1952 | Cummins | 152/225 R |
| 2,744,558 | 5/1956 | Ciavola | 152/228 |
| 3,114,407 | 12/1963 | Patterson | 152/213 R |
| 3,122,192 | 2/1964 | Seidell | 152/225 R |

Primary Examiner—John E. Kittle
Assistant Examiner—Thomas Bokan
Attorney, Agent, or Firm—Hill, Van Santen, Steadman, Chiara & Simpson

[57] ABSTRACT

Traction is provided for automotive vehicles stuck in snow, mud, and the like by a device applied over the outer face of the slipping driven vehicle wheel and having J-shaped traction fingers draped over the tire of the wheel and fixedly clamped on the tire by merely swinging a lever. The device has a mounting plate for overlying the conventional wheel disk or hubcap, three J-shaped fingers pivoted to the center of the plate and radially guided in 120° spaced apart relation at the periphery of the plate with the cups of the fingers receiving the tire and presenting outer tread surfaces which will bite into the slippery road bed. One of the fingers is retracted on its pivot by a lever or handle effective to clamp all three of the fingers on the tire.

10 Claims, 10 Drawing Figures

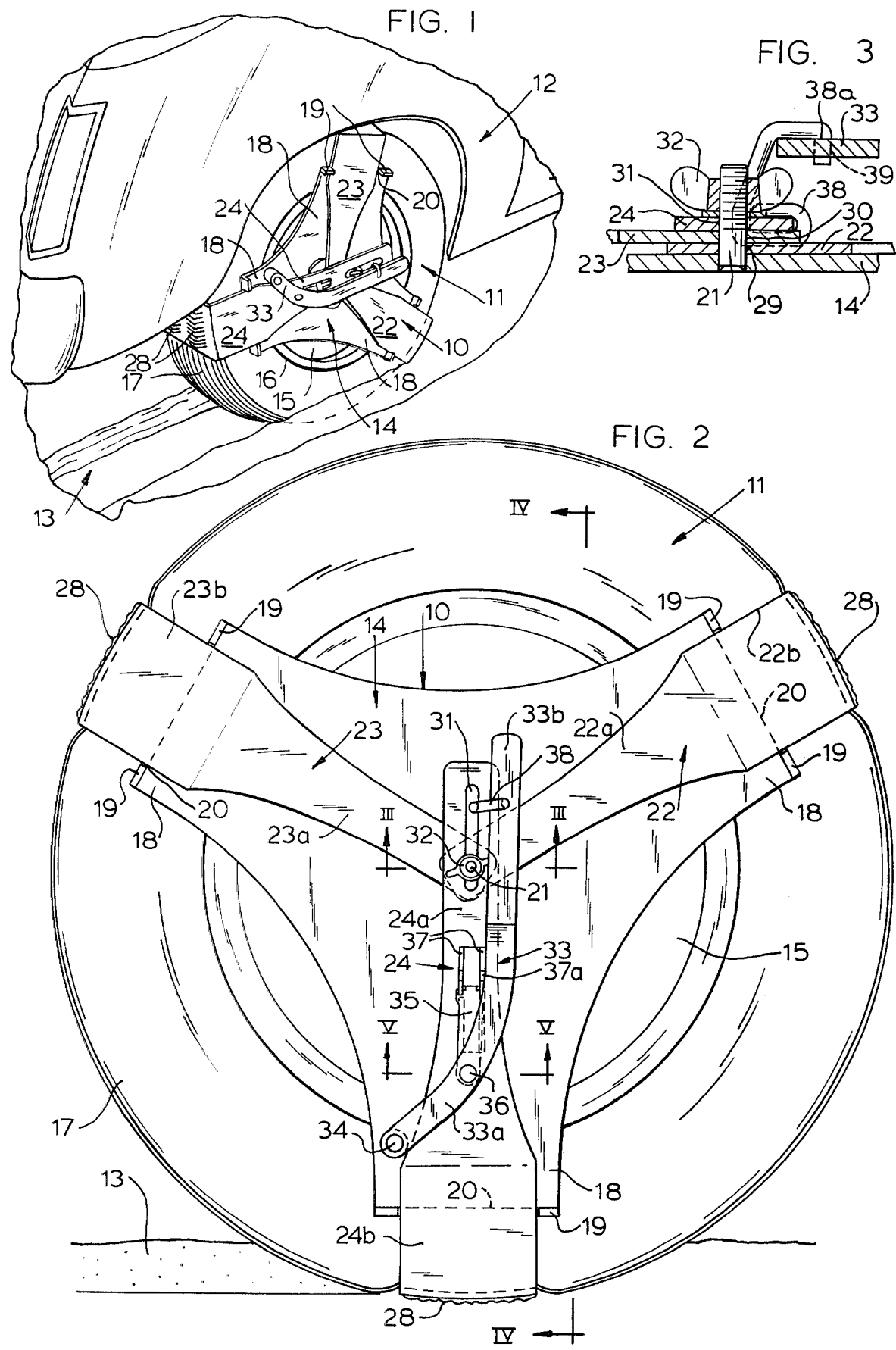

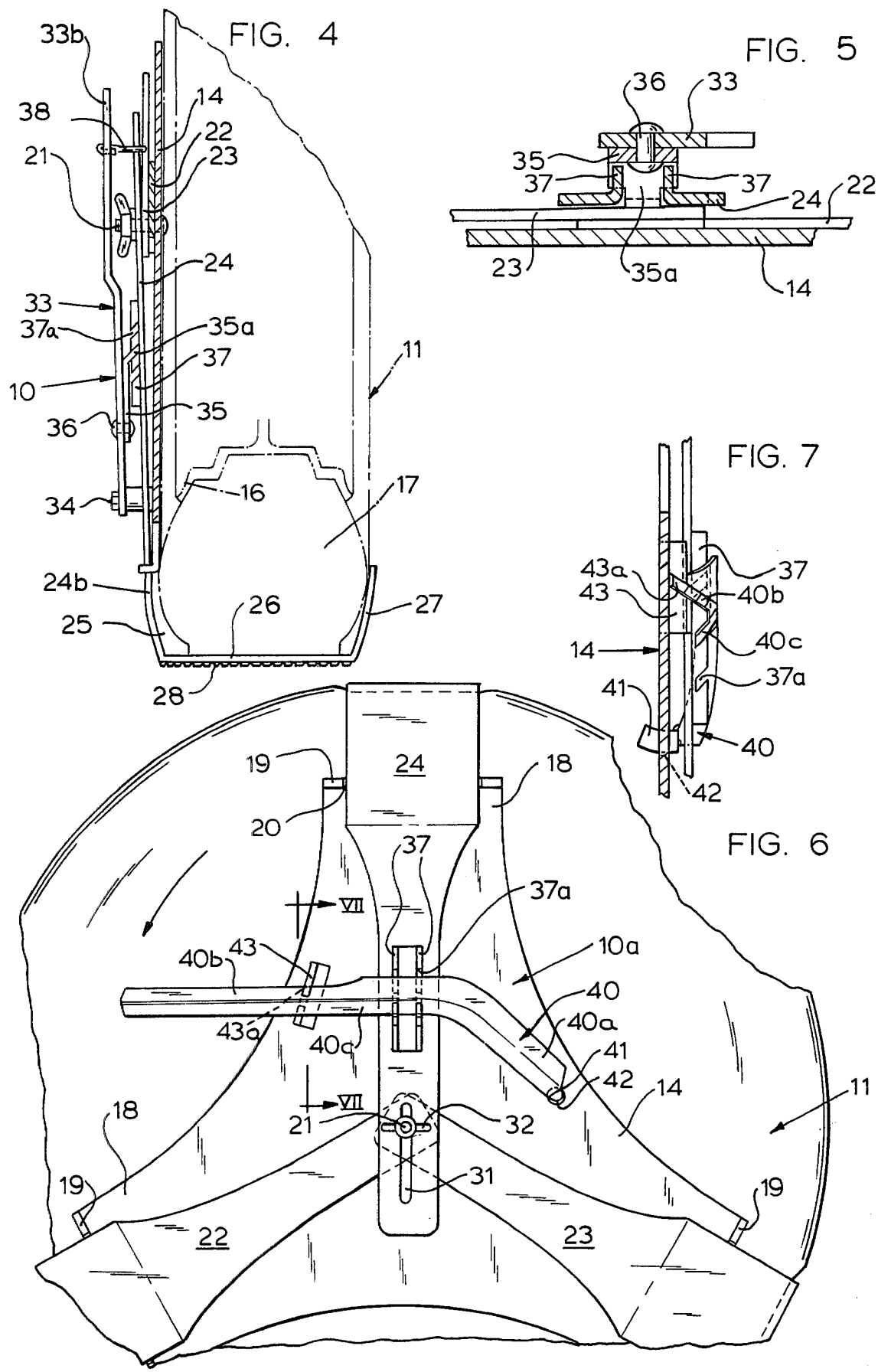

FIG. 8
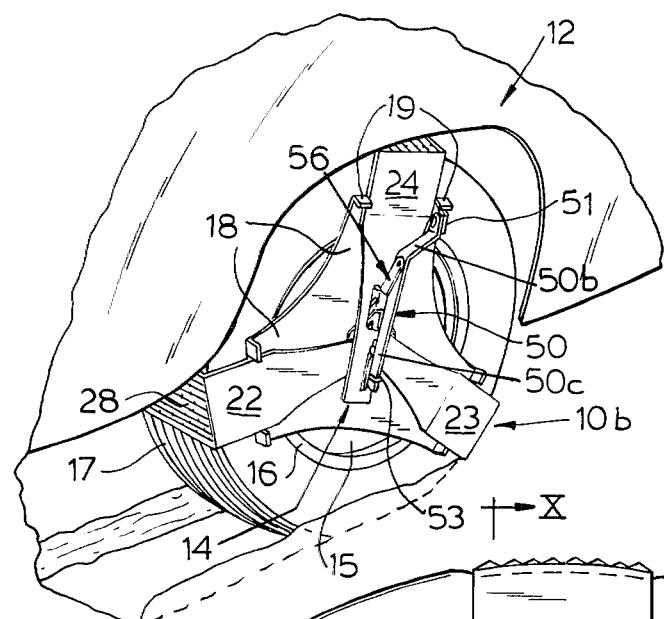
FIG. 10
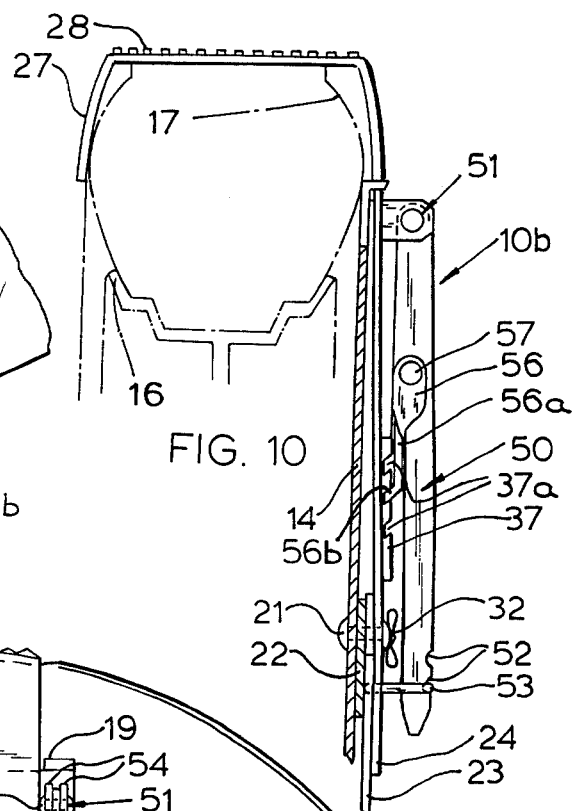
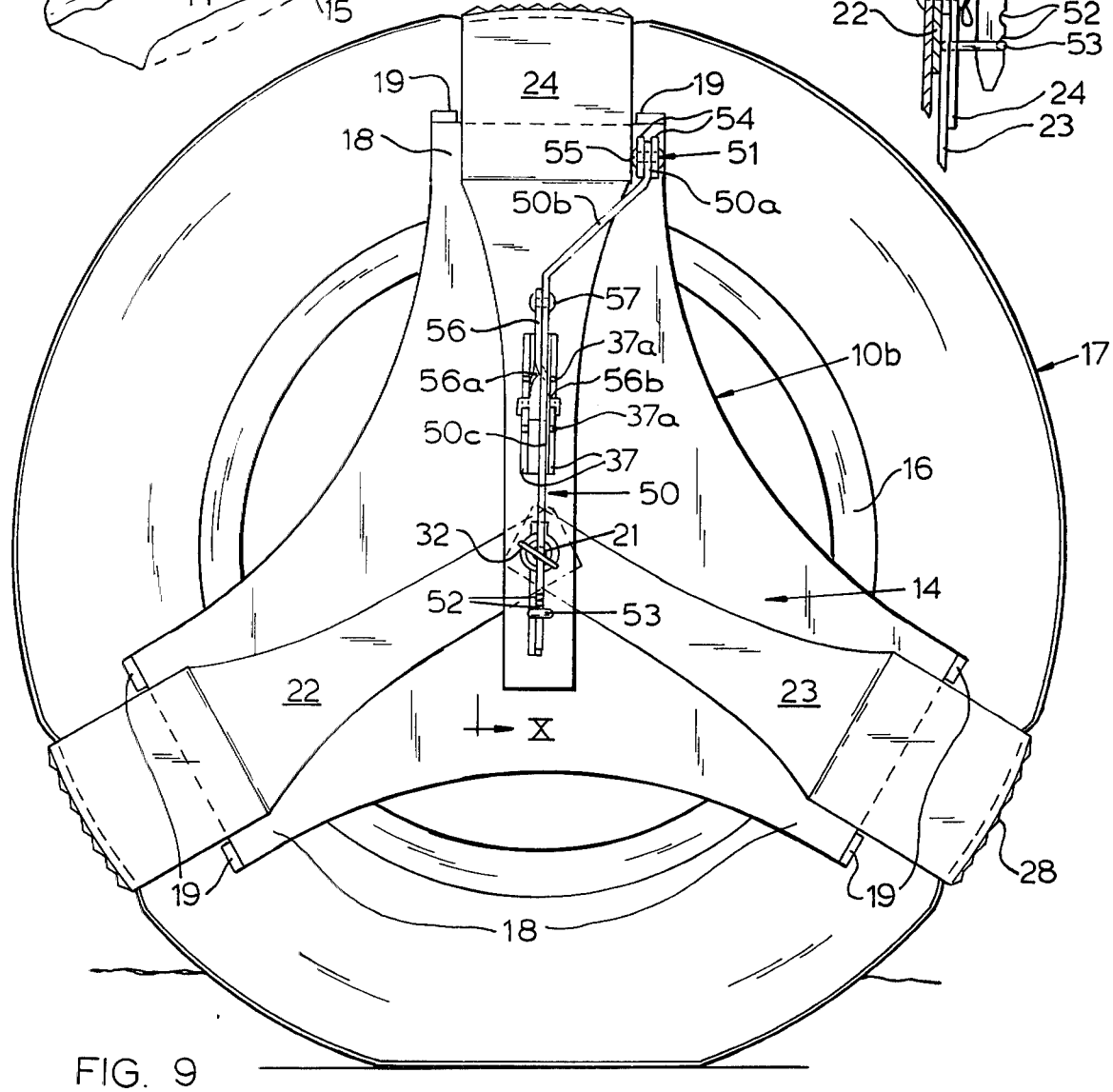
FIG. 9

TIRE TRACTION DEVICE

FIELD OF THE INVENTION

This invention relates to the art of wheel traction devices and specifically deals with a device applied over the outer face of a driven automobile wheel having fingers radiating therefrom with ends hooked over the tire of the wheel to present road bed gripping surfaces.

Prior Art

Heretofore traction devices for automobile wheels had to be wrapped around the periphery of the wheel tire of required apertured wheels to accommodate transverse clamps or the like. Such devices had to be applied around the inner side of the wheel subjecting the motorist to dirt and discomfort and requiring considerable effort in awkward positions. It would be an improvement in the art to provide a device that is easily clamped on automobile wheels from the outer face of the wheel to present tread portions on the wheel tire which will bite into and securely grip slippery road beds so as to give traction to the wheel when the vehicle is stuck in a snow bank or the like.

SUMMARY OF THIS INVENTION

According to this invention there is provided a device applied to the outer face of a driven vehicle wheel having radiating fingers with hook ends that are draped over the tire of the wheel and clamped in locked position on the tire to present tread areas which will bite into the road bed for providing traction to the wheel. Since the device of this invention is applied entirely from the exposed outer face of the wheel, the person mounting the device on the wheel is not subjected to the dirt and discomfort of working under the vehicle. The clamping of the device on the wheel is effected by the swinging of a lever or handle that is readily accessible on the outer side face of the device.

It is then an object of this invention to provide a traction device for vehicle wheels that is applied to the outer face of the wheel and easily clamped to the wheel from this outer face to provide tread surfaces which will bite into the road bed.

Another object of this invention is to provide an easily applied and removed traction device for automobile wheels which has a plurality of J-shaped fingers draped over the tire of the wheel and presenting tread surfaces which will bite into the road bed.

Another object of the invention is to provide an inexpensive easily applied traction device for clamping on automobile wheels to present tread surfaces at spaced intervals around the wheel tire which will bite into the road bed.

A specific object of the invention is to provide a traction device for automotive vehicle wheels having a mounting plate fitting over the wheel disk or hubcap, a plurality of J-shaped fingers pivoted on the plate and a lever for retracting one of the fingers to effect a clamping of all of the fingers on the wheel tire to present gripping treads on the tire.

A specific object of the invention is to provide a tire clamp presenting rigid tread portions that will bite into the road bed which are locked in position by a lever.

Other and further objects of this invention will become apparent to those skilled in this art from the following detailed description of the annexed sheets of drawings which, by way of preferred examples only, illustrate three embodiments of the invention.

ON THE DRAWINGS

FIG. 1 is a fragmentary perspective view of the rear portion of an automotive vehicle with the driving wheel thereof having a traction device of this invention clamped thereon.

FIG. 2 is a side elevational view of the traction device of this invention clamped on a vehicle wheel.

FIG. 3 is a fragmentary cross sectional view along the line III—III of FIG. 2.

FIG. 4 is a fragmentary cross sectional view along the line IV—IV of FIG. 2.

FIG. 5 is a fragmentary cross sectional view along the line V—V of FIG. 2.

FIG. 6 is a view similar to FIG. 2 illustrating a first modified embodiment of the traction device.

FIG. 7 is a fragmentary cross sectional view along the line VII—VII of FIG. 6.

FIG. 8 is a fragmentary perspective view, similar to FIG. 1, of the rear portion of an automotive vehicle with the driving wheel thereof having a second modified traction device of this invention clamped thereon.

FIG. 9 is a side elevational view of the second modified traction device of this invention clamped on a vehicle wheel.

FIG. 10 is a fragmentary cross sectional view along the line X—X of FIG. 9.

AS SHOWN ON THE DRAWINGS

In FIG. 1 the traction device 10 of this invention is illustrated as clamped on a rear driving wheel 11 of an automobile 12 to provide traction for the wheel on a slippery road bed 13 such as snow, mud, ice or the like.

The traction device 10 has a mounting or base plate 14 fitting over the wheel disk 15 or the like outer face of the wheel and preferably extends radially beyond the wheel rim 16 and partially over the outer side face of the wheel tire 17. This plate 14 may be flat or dome shaped to overlie a projecting wheel cover or disk 15.

The preferred form of the plate 14 has three radially projecting arms 18 spaced 120° apart and each provided with upturned flanges 19,19 defining therebetween a guide slot 20.

A stud 21 is mounted in the center of the plate 14 and projects outwardly therefrom to provide a pivot for three superimposed J-shaped fingers 22, 23 and 24 which overlie the plate 14 and each radiate from the stud to extend through a slot 20 to be radially guided in their 120° spaced apart relation by the flanges 19.

The cups 25 of the J-shaped fingers 22, 23 and 24 receive the tire 17 therein as best shown in FIG. 4. The fingers preferably have narrow radial inner ends 22a, 23a and 24a diverging to wide radial outer ends 22b, 23b and 24b with these wide outer ends fitting freely between the flanges 19 so that the fingers can be swung into the slots 20 to be held in 120° spaced apart relation over the plate 14. The wide outer ends of the fingers project over the side face of the tire 17 beyond the arms 18 of the plate 14 and are then bent at about a right angle to overlie the tread of the tire 17 as best illustrated at 26 in FIG. 4. These portions 26 project beyond the inner side of the tire tread and are then bent backward at 27 to form a flange which will overlie the inner face of the tire 17. Thus each J-shaped finger has a cup 25 defined by a hook-like end with a portion 26 overlying the tread of the tire and a portion 27 uderlying the inner side face of the tire. The outer surface of each portion 26 is roughened or lanced to provide teeth 28 which will bite into the road 13.

The bottom finger 22 has a circular hole 29 at the inner end thereof receiving the stud 21 therethrough as shown in FIG. 3 so that this finger is held by the stud against radial movement on the plate 14. Likewise the intermediate finger 23 has a circular hole 30 snugly receiving the stud 21 therethrough and retaining the finger against radial movement. However the top finger 24 has an elongated slot 31 extending longitudinally along its inner end as also shown in FIG. 2. This slot accommodates radial shifting of the top finger 24 relative to the mounting plate 14. A wing nut 32 is threaded on the stud 21 to retain the stack of fingers on the stud and of course the fingers can be removed from the plate by removal of this wing nut.

A lever or crank 33 is pivoted at one end to the plate 14 adjacent the sliding finger 24 by means of a pivot pin 34. This lever is curved from the pivoted end thereof to overlie the finger 24 as illustrated at 33a in FIG. 2 and then has a straight free end portion 33b laterally offset from the pivot 34. A dog latch 35 is pinned at 36 to the underface of the curved portion 33a of the lever 33 and has a turned down end tooth 35a on the swingable free end thereof.

The narrow portion 24a of the top finger 24 is slit along a portion of the length thereof and longitudinal flanges 37 are bent upwardly from the top face of the finger portion 24a. These flanges have spaced notches 37a arranged in transversely aligned pairs to selectively receive the turned in tooth 35a of the dog 35. When this tooth is engaged in an aligned pair of notches, the lever 33 may be swung about its pivot 34 toward the stud 21 thereby retracting the finger 24 radially inward.

A wire hook 38 slidably mounted in the slot 31 has a free end pin portion 38a adapted to be seated in a hole 39 of the lever 33 to lock the lever in the position shown in FIGS. 2 and 3 where it has retracted the finger 24.

To mount the device 10 on the wheel 11, the plate 14 is positioned over the wheel disk or hubcap 15 with the lever 33 swung away from the finger 24 so that this finger can slide freely on the stud 21. All three of the fingers can then be swung to be draped over the top of the tire 17. The fingers are then swung to fit in their slots 20 and the wing nut 32 can be snugged up to hold the fingers in their slot without however being sufficiently tightened to interfere with the sliding of the finger 24. Next the tooth 35a of the dog 35 is seated in a pair of notches 37a and the lever or crank 33 is swung to its locked position thereby retracting the finger 34 and clamping all three of the hook-like ends of the J-shaped fingers tightly on the tire 17. The locking ring 38 is then engaged with the lever to hold it in its locked position. Since a plurality of notches 37a are provided for receiving the tooth 35a of the dog 35, the device is adapted for clamping on wheels of different diameters.

With the device 10 clamped on the wheel 11 the roughened or toothed tread surfaces 28 of the fingers will engage the road bed 13 to provide traction for the wheel enabling the vehicle to pull out of ruts, snow banks, and the like.

It will of course be understood that the device 10 is applied entirely from the open side face of the wheel and is manipulated in the open without subjecting the operator to discomfort or soil from the underpinnings of the vehicle.

In the first modified device 10a of FIGS. 6 and 7, the same reference numerals have been used to identify components corresponding with the components of the device 10. As shown in FIG. 7 a lever or crank 40 is swivelled on the plate 14 by a pin 41 on one end thereof seated in a hole 42 in the plate 14. The lever 40 has a curved or inclined portion 40a extending from the pin 41 to a straight handle portion 40b extending over the top finger 24. The notches 37a of the upturned flanges 37 on the finger 24 receive a downturned tooth or flange 40c of the lever 40. An upturned ear 43 on the plate 14 provides a notches 43a receiving the handle portion 40b of the lever 40. Then when the lever is swung counterclockwise as shown by the arrow in FIG. 6 the finger 24 will be retracted to clamp all three of the fingers on the tire 17. Then the lever is latched under the notched retainer ear 43 on the plate 14.

The device 10a is positioned on the wheel in the same manner as the device 10 and functions in the identical manner.

In the second modified device 10b of FIGS. 8, 9 and 10, the same reference numerals have also been used to identify components corresponding with the components of the device 10. As shown in FIGS. 8–10 the second modified device 10b has the same base plate 14 and fingers 22, 23 and 24 as the device 10 but a modified crank or lever arrangement is provided including a lever 50 pivoted at 51 to an arm 18 of the base plate 14 adjacent the finger 24, to swing toward and away from the device instead of parallel to the device as in the embodiments 10 and 10a. This lever 50 has a pivoted end portion 50a parallel with the adjacent finger 24, an offset portion 50b extending over the finger 24 and a main handle portion 50c overlying the axial centerline of the finger with notches 52 in its outer edge adjacent the free end thereof to receive a retaining ring 53 carried by the finger 24 to hold the lever adjacent the finger.

The end portion 50a of the lever fits between a pair of ears 54 on the arm 18 and a pivot pin 55 inserted through the fingers and lever portion 50a forms the pivot assembly 51 to swingably mount the lever so that it may be swung in a plane at right angles to the device 10b.

The portion 50c of the lever 50 has a dog latch 56 pivoted at 57 to a side face of the lever adjacent the offset portion 50b so that the dog can swing alongside the lever arm portion 50c. The dog 56 is twisted at 56a to provide a finger 56b adapted to drop into the notches 37a of the flanges 37 on the finger 24.

The second modified device 10b is applied to the tire 17 in the same manner as described above with the lever 50 swung away from the finger 24 so as to allow the finger to slide freely. Then the lever is dropped toward the finger 24 to engage the dog finger 56b in a notch 37a. Then when the lever is pushed toward the finger 24 the dog latch will retract the finger and snug up all of the fingers on the tire. Finally when the lever is forced inwardly sufficient to receive the locking ring 53, the J ends of the fingers will all be pulled into the tread of the tire thus securely clamping the device on the tire and wheel.

As shown in the drawings, the components of the traction devices are metal.

It should be understood from the above descriptions that the devices of this invention are easily applied to a driving wheel of a vehicle to afford traction on slippery road beds, ruts, snow banks and the like.

Although modifications might be suggested by those versed in the art, it should be understood that I wish to embody within the scope of the patent granted hereon all such modifications as reasonably and properly come within the scope of my contribution to the art.

I claim as my invention:

1. A traction device for application to driven wheels which comprises a mounting base adapted to be positioned over the outer face of the wheel to extend radially beyond the wheel rim, a stud mounted on and projecting outwardly from the central portion of said base, a plurality of superimposed J-shaped fingers pivotally stacked on said stud and radiating from said base having cups for receiving the periphery of the wheel, road gripping tread surfaces on said cups, means accommodating radial movement of one of said fingers on said stud, and means on said base capable of retracting said one of said fingers to clamp all of the fingers on the periphery of the wheel.

2. The device of claim 1 including finger guides on the outer peripheral portion of said mounting base holding the cups of said fingers in equally spaced circumferential relationship.

3. The device of claim 2 wherein said mounting base has three radiating fingers in equally spaced circumferential relation and said guides are spaced outturned flanges on the outer ends of said fingers of the mounting base defining slots therebetween for slideably receiving the fingers.

4. The device of claim 1 wherein the superimposed J-shaped fingers are three in number with two of the three fingers held against radial shifting by the stud the third finger being radially shiftable on the stud and the retraction means engages said third finger to force retraction by said means.

5. The device of claim 1 including three J-shaped fingers having radial inner ends in stacked relation pivoted on said stud and radiating from the stud through guides on the periphery on the mounting base.

6. The device of claim 1 wherein the means capable of retracting the one finger is a lever pivoted at one end on the base, a dog pivoted on the lever, and notches on said one finger selectively receiving the dog and constructively arranged so that swinging of the lever will retract said one finger to effect the clamping of all of the fingers on the periphery of the wheel.

7. The device of claim 1 wherein the means capable of retracting said one of said fingers is a lever having a free end swingable toward and away from the outer face of the mounting base, a toothed dog is pivotally mounted on the lever intermediate its ends, and said radially movable finger has notches selectively receiving the teeth of said dog to effect retraction of said finger.

8. A device for biting into roadbeds to apply traction to spinning driven rubber tire equipped wheels which comprises a base plate adapted to be positioned over the outer face of a wheel and extend radially beyond the wheel rim over the outer face of the rubber tire, a stack of three superimposed J-shaped fingers pivoted on said base plate and extending radially therefrom, finger guides on said base plate at the outer periphery thereof positioning the three fingers in 120° spaced apart relation to hook over the periphery of a wheel, means on one of said fingers accommodating radial shifting thereof, a crank on said base plate engaging said one of said fingers and swingable on the base plate to forcibly retract said one finger for clamping all of the fingers on the wheel, and road gripping surfaces on the portions of the fingers which hook over the wheel periphery.

9. The device of claim 8 wherein said finger guides are outturned flanges on the periphery of the base plate receiving the fingers therebetween.

10. The device of claim 8 wherein said base plate has three equally spaced arm portions radiating from the center, a stud projects from the center pivotally supporting the fingers, and each arm has a pair of spaced outturned flanges on the outer end thereof defining therebetween a guide for holding the fingers against swinging on the stud to maintain them in 120° spaced relation.

* * * * *